United States Patent Office 3,441,595
Patented Apr. 29, 1969

3,441,595
SUBSTITUTED HYDRAZINE COMPOUNDS
Roland Jaunin, Basel, and Paul Zeller, Allschwil, Switzerland, assignors to Hoffmann-La Roche Inc., Nutley, N.J., a corporation of New Jersey
No Drawing. Filed Feb. 10, 1966, Ser. No. 526,374
Claims priority, application Switzerland, Mar. 5, 1965, 3,126/65
Int. Cl. C07c 125/06, 109/02; A61k 27/00
U.S. Cl. 260—471        9 Claims

ABSTRACT OF THE DISCLOSURE

Substituted hydrazines of the formula

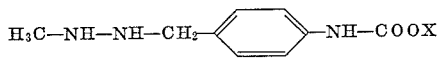

wherein X is lower alkyl, and intermediates are described. The end products demonstrate useful cytostatic activity.

---

The present invention is concerned with novel substituted hydrazine compounds of the formula

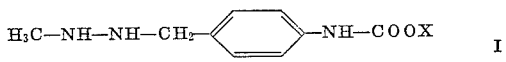    I in which X is lower alkyl, as well as salts of these compounds.

The lower alkyl group denoted by X can contain up to 7 carbon atoms. It can be a straight or branched chain saturated hydrocarbon such as methyl, ethyl, isopropyl or the like. X preferably represents the ethyl or isopropyl group.

Preferred representatives of this class of compounds are accordingly 1-(p-ethoxycarbonyl-amino-benzyl)-2-methyl-hydrazine and 1-(p-isopropoxycarbonyl-amino-benzyl)-2-methyl-hydrazine.

In one embodiment, the compounds of Formula I can be manufactured by freeing a compound of the formula

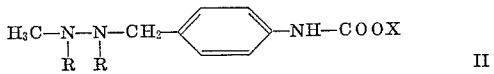    II in which X has the significance given above and R represents aryl-lower alkoxycarbonyl, of the residue denoted by R, or by hydrogenating a compound of the formula

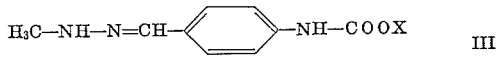    III in which X has the significance given above, or by hydrogenating a compound of the formula

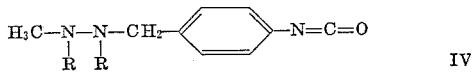    IV in which R has the significance given above, in the presence of a lower alkanol, and by converting the hydrazine derivative obtained into a salt if desired.

Of the aryl-lower alkoxycarbonyl groups denoted by R, those in which the aryl residue is a phenyl residue are preferred. The term lower alkoxy includes hydrocarbon-oxy moieties containing a lower alkyl group. The benzyloxycarbonyl group is particularly suitable as a protecting group.

The starting compounds of Formula II can be prepared as follows:

p-Lower-alkoxycarbonylamino-benzoic acid is converted into the corresponding acid halide (preferably chloride or bromide) and reduced in the presence of a complex metal hydride (e.g. in the presence of lithium aluminum hydride). With the aid of a halogenating agent (e.g. with thionyl chloride), the so-obtained p-lower alkoxycarbonylamino-benzyl alcohol is then converted into a p-lower alkoxycarbonylamino-benzyl halide (e.g. chloride) which is then reacted with an alkali salt of a 1,2-bis-arylalkoxycarbonyl-2-methyl-hydrazine to the desired 1,2-bis-(arylalkoxycarbonyl)-1-(p-lower alkoxycarbonyl-amino-benzyl)-2-methyl-hydrazine of Formula II.

The starting compounds of Formula III can be prepared as follows:

The p-alkoxycarbonylamino-benzyl halide (e.g. chloride) obtainable as described hereinbefore is converted by a Sommelet reaction into the corresponding aldehyde. This is then reacted with anhydrous methylhydrazine to the desired 1-(p-lower alkoxycarbonylaminobenzylidene)-2-methyl-hydrazine of Formula III.

The starting compounds of Formula IV can be prepared as follows:

1,2-bis-(arylalkoxycarbonyl)-1-(p-carboxybenzyl) - 2-methyl-hydrazine is converted into a reactive derivative (e.g. into a halide or an ester) and reacted with sodium azide to the corresponding 1,2-bis-(arylalkoxycarbonyl)-1-(p-azidocarbonylbenzyl) - 2 - methyl-hydrazine. This is transformed by a Curtius reaction into the desired 1,2-bis-(arylalkoxycarbonyl) - 1 - (p-isocyanato-benzyl)-2-methyl-hydrazine of Formula IV.

The protecting groups R present in the compounds of Formula II may be split off in a manner known per se (e.g. by hydrogenolysis).

The hydrogenolysis is conveniently carried out with catalytically activated hydrogen. A noble metal catalyst, especially palladium/carbon, is preferably used as the catalyst.

The hydrazones of Formula III can be converted into the desired end products in a manner known per se by hydrogenation, conveniently in the presence of noble metal catalysts such as platinum oxide or palladium/carbon, preferably in an inert solvent such as a lower alkanol as methyl or ethyl alcohol.

Likewise, the isocyanates of Formula IV, in the presence of a lower alkanol can be converted directly into the desired end products in a manner known per se by hydrogenation. Here also the hydrogenation is conveniently carried out in the presence of a noble metal catalyst, especially in the presence of palladium/carbon.

The substituted hydrazine compounds of Formula I form pharmaceutically acceptable salts with both medicinally acceptable inorganic and organic acids; for example, with hydrohalic acids such as hydrochloric acid, with other mineral acids such as sulfuric acid or phosphoric acid, as well as with organic acids such as tartaric acid, citric acid, oxalic acid, camphor-sulfonic acid, salicyclic acid, ascorbic acid, maleic acid, mandelic acid, and the like. Preferred salts are the hydrohalides, especially the hydrochlorides. The acid solution salts are preferably manufactured in an inert solvent by treatment of the free base with the corresponding acid. Non-pharmaceutically acceptable acid-addition salts can be converted into pharmaceutically acceptable acid-addition salts by neutralization followed by reaction with a suitable medicinally acceptable acid.

The hydrazine compounds of Formula I, as well as pharmaceutically acceptable acid-addition salts thereof, are useful as cytostatic agents. Thus, they inhibit the growth of transplantable tumors, e.g. Walker carcinoma, in mice and rats. In particular, 1-(p-ethoxycarbonylamino-benzyl-2-methyl-hydrazine, as well as 1-(p-isopropoxy-carbonylamino-benzyl)-2-methyl-hydrazine, are especially active against the Walker carcinoma of rats.

The hydrazine compounds of Formula I are accordingly pharmaceutically useful: for example, they can be administered internally in the form of conventional pharmaceutical preparations which contain the active materials or their pharmaceutically acceptable acid-addition salts in admixture with a pharmaceutical organic or inorganic inert carrier which is suitable for enteral or parenteral application such as, for example, water, gelatin, gum arabic, lactose, starch, magnesium stearate, talc, vegetable oils, polyalkyleneglycols, Vaseline, and the like. The pharmaceutical preparations can be submitted in solid form (e.g. as tablets, dragées, suppositories, capsules) or in liquid form (e.g. as solutions, suspensions or emulsions). They may be sterilized and/or contain additives such as preserving, stabilizing, wetting or emulsifying agents, salts for varying the osmotic pressure, or buffers. They can also contain other therapeutically active materials.

The following examples are illustrative of the invention but not limitative thereof. All temperatures are stated in degrees centigrade.

EXAMPLE 1

6.2 g. of 1-(p-methoxycarbonylamino-benzylidene)-2-methyl-hydrazine is suspended in 50 ml. of absolute methanol. Then, 1 g. of 5% palladium/charcoal is added thereto and the reaction mixture shaken in a hydrogen atmosphere under normal conditions. After the uptake of the theoretical quantity of hydrogen (1-2 hours), the hydrogenation comes to a standstill. The catalyst is then filtered off under a nitrogen atmosphere and the filtrate is treated with a small excess of a 1 N methanolic hydrochloric acid solution and subsequently, in order to promote crystallization, with 80 ml. of absolute ether. The 1-(p-methoxycarbonylaminobenzyl)-2-methyl-hydrazine hydrochloride which precipitates is then left standing for 1 hour at about 0° under an atmosphere of air but with moisture-exclusion. The precipitate is then filtered off and washed with absolute ether. The resultant colourless 1-(p-methoxycarbonylamino-benzyl)-2-methyl-hydrazine hydrochloride (which colours yellow in moist air) melts at 185–187° with decomposition. The melting point remains unaltered after further recrystallization of the compound from methanol/ether.

The starting material employed above can be prepared as follows:

195 g. of p-methoxycarbonylamino-benzoic acid is suspended in 3000 ml. of absolute benzene. The suspension is treated with 86 ml. of thionyl chloride and then with 8 ml. of dimethylformamide, after which the reaction mixture is heated under reflux for 1 hour. There forms an almost clear solution which is filtered while hot and, after cooling, the filtrate is treated with about 250 ml. of petroleum ether (boiling range 30–50° C.). The p-methoxycarbonylamino-benzoyl chloride crystals which precipitate in the cold are isolated, washed with petroleum ether and dried in a vacuum, yielding p-methoxycarbonylamino-benzoyl chloride melting at 157–159°.

42.7 g. of p-methoxycarbonylamino-benzoyl chloride is dissolved in 600 ml. of anhydrous tetrahydrofuran, the solution treated at 5–10° with a suspension of 11.4 g. of lithium aluminum hydride in 300 ml. of anhydrous tetrahydrofuran, and then shaken at room temperature for 2 to 3 hours. The reaction mixture is then cooled to 0–5° and treated very carefully with 500 ml. of water and thereafter with a small excess of hydrochloric acid. The tetrahydrofuran is then distilled off and the aqueous solution which remains behind is extracted with chloroform. The chloroform extract is evaporated to dryness. The residue is p-methoxycarbonylamino-benzyl alcohol (a gradually crystallizing oil) which is taken up in 200 ml. of chloroform and, after the addition of 10.5 ml. of thionyl chloride, heated under reflux conditions for 2 hours. The reaction mixture is then evaporated under reduced pressure. In order to completely remove the excess thionyl chloride, the residue is several times dissolved in benzene and evaporated. The residue is subsequently taken up in 1000 ml. of boiling n-heptane, separated from insoluble portions and cooled. The colourless p-methoxycarbonylamino-benzyl chloride which precipitates in crystalline form melts at 117–119° with decomposition.

13 g. of p-methoxycarbonylamino-benzyl chloride is dissolved with 10 g. of hexamethylene tetramine in 60 ml. of chloroform, and the solution heated under reflux conditions for 5 hours. The reaction product which separates little by little is, after cooling, treated with 150 ml. of ether, filtered off, washed with absolute ether and, after the addition of 50 ml. of 50% acetic acid, hydrolytically cleaved by heating under reflux conditions for 1 hour. The crystalline p-methoxycarbonylamino-benzaldehyde which precipitates on cooling is filtered off after the reaction mixture is left standing in the cold for about 12 hours and washed with water. The so-obtained p-methoxycarbonylamino-benzaldehyde melts at 156–157°. After recrystallization of this compound from methanol, the melting point remains unaltered.

8 g. of p-methoxycarbonylamino-benzaldehyde is dissolved in 60 ml. of absolute ethanol and, after the addition of 2.5 g. of anhydrous methyl-hydrazine and 0.4 g. of glacial acetic acid, the reaction mixture is heated under reflux conditions for 1 hour. The reaction solution is filtered while hot, the filtrate cooled and then gradually treated with 120 ml. of ice-water. The 1-(p-methoxycarbonylamino-benzylidene)- 2 -methyl-hydrazine which precipitates is an almost colourless powder which, after washing with water and drying in vacuum, melts at 130–132°.

EXAMPLE 2

22 g. of 1,2-bis-(benzyloxycarbonyl)-1-(p-methoxycarbonylamino-benzyl)-2-methyl-hydrazine is dissolved in 400 ml. of absolute methanol and, after the addition of 3 g. of 5% palladium/charcoal, the reaction mixture is hydrogenated under normal conditions. After the uptake of 1.8 l. of hydrogen, the hydrogenation process comes to a standstill. The reaction mixture is then filtered under a nitrogen atmosphere, the filtrate concentrated to a volume of 100 ml. and, after the addition of a small excess of a 1 N methyl alcoholic hydrogen chloride solution and 100 ml. of absolute ether, placed in the refrigerator overnight. The crystalline 1-(p-methoxycarbonylamino-benzyl)-2-methyl-hydrazine hydrochloride which precipitates is filtered off with the exclusion of atmospheric moisture and washed with a little (about 10 ml.) absolute ether. The compound is identical with the product obtained according to Example 1.

The starting material employed above can be prepared as follows:

A solution of 15.5 g. of 1,2-bis-benzyloxycarbonyl-2-methyl-hydrazine in 50 ml. of absolute dimethylformamide is introduced dropwise at 20–25° into a suspension of 1.25 g. of lithium hydride in 25 ml. of absolute dimethylformamide and, after the addition of 10 g. of p-methoxycarbonylamino-benzyl chloride in 60 ml. of absolute dimethylformamide, heated at 80° for 3 hours. The reaction mixture obtained is treated with 500 ml. of ice water and extracted with methylene chloride. The extract is washed with water and then evaporated under reduced pressure. The residual slightly yellow-coloured oily 1,2-bis-(benzyloxycarbonyl)-1-(p-methoxycarbonylamino-benzyl) - 2 - methyl-hydrazine is immediately further used as described above.

EXAMPLE 3

8.9 g. of 1,2-bis-(benzyloxycarbonyl)-1-(p-isocyanatobenzyl)-2-methyl-hydrazine is suspended in 200 ml. of absolute methanol and the suspension then heated under reflux conditions for 30 minutes. After cooling, 2 g. of 5% palladium/charcoal is added to the so-obtained solution and the mixture then hydrogenated at atmospheric pressure and room temperature. After the uptake of 0.6 l. of hydrogen, the hydrogenation process comes to a standstill. The reaction mixture is then filtered under a nitrogen atmosphere, the filtrate concentrated to a volume of 50 ml. and, after the addition of a small excess of a 1 N methyl alcoholic hydrogen chloride solution and 50 ml. of absolute ether, placed in the refrigerator overnight. The crystalline 1-(p-methoxycarbonylamino-benzyl)-2-methyl-hydrazine hydrochloride which precipitates is identical with the product obtained in accordance with Examples 1 and 2.

The starting material employed above can be prepared as follows:

Into a suspension of 45 g. of 1,2-bis-(benzyloxy-carbonyl) - 1 - (p-carboxybenzyl) - 2 - methyl-hydrazine in 72 ml. of acetone there is introduced dropwise at a temperature of 0–5°, after the addition of 22 ml. of water, first a solution of 16.2 ml. of triethylamine in 87 ml. of acetone and then a solution of 12 ml. of ethyl chloroformate in 29 ml. of acetone. After the reaction mixture is then permitted to stand for 30 minutes at 0–5°, a solution of 10 g. of sodium azide in 58 ml. of water is added thereto. The mixture is then stirred at 0–5° for 2 hours, poured into 1.5 l. of water saturated with sodium chloride and extracted with ether. The extract is successively washed with water, with a 10% aqueous sodium carbonate solution and again with water, dried over anhydrous sodium sulphate and evaporated under reduced pressure. The residual 1,2-bis-(benzyloxy-carbonyl) - 1 - (p-azidocarbonyl-benzyl) - 2 - methyl-hydrazine, a yellowish oil, is dissolved in 170 ml. of absolute toluene, the solution heated to 100° and held at this temperature (about 2 hours) until the evolution of nitrogen has died away. The solvent is then evaporated off under reduced pressure at 70°. The oily residue is taken up in 20 ml. of n-butyl oxide and cooled at about 0° for about 120 hours. The slightly yellow-coloured crystalline, 1,2-bis-(benzyloxycarbonyl)-1-(p-isocyanato-benzyl)-2-methyl-hydrazine which precipitates is isolated, washed with about 10 ml. of cold petroleum ether (boiling range 30–50°) and dried at 30°/0.1 mm. Hg. The so-obtained product melts at 50–53° with decomposition.

EXAMPLE 4

6.6 g. of 1-(p-ethoxycarbonylamino-benzylidene)-2-methyl-hydrazine is hydrogenated according to the procedure described in Example 1. The 1-(p-ethoxycarbonylamino-benzyl)-2-methyl-hydrazine hydrochloride obtained (a crystalline, almost colourless powder) melts at 137–139° with decomposition after recrystallization from ethanol/ether.

The starting material employed above can be prepared according to the procedures utilized to prepare the starting material of Example 1 starting from p-ethoxycarbonylaminobenzoic acid via the intermediates: p-ethoxycarbonylamino-benzoyl chloride (melting point 108–110°); p-ethoxycarbonylamino-benzaldehyde (melting point 138–140°). The 1-(p-ethoxycarbonylamino-benzylidene)-2-methyl-hydrazine obtained melts at 125–127° C.

EXAMPLE 5

7.1 g. of 1-(p-isopropoxycarbonylamino-benzylidene)-2-methylhydrazine are hydrogenated according to the procedure described in Example 1. The 1-(p-isopropoxycarbonylamino-benzyl)-2-methylhydrazine hydrochloride obtained melts at 157–159° after recrystallization from isopropanol/ether.

The starting material employed above can be prepared according to the procedures utilized to prepare the starting material of Example 1 starting from p-isopropoxycarbonylaminobenzoic acid via p-isopropoxycarbonylamino-benzaldehyde (melting point 109–111°). The 1-(p-isopropoxycarbonylamino-benzylidene) - 2-methyl-hydrazine obtained is an unstable compound melting at 85–87° with decomposition which must be further used immediately upon preparation.

EXAMPLE 6

Manufacture of dragees of the following composition:

| | Mg. |
|---|---|
| 1 - (p - methoxycarbonylamino-benzyl) - 2 - methyl-hydrazine | 25 |
| Mannitol | 100 |
| Corn starch | 20 |
| Talcum | 5 |
| | 150 |

The active material is mixed with the mannitol and passed through a No.5 sieve (mesh width about 0.23 mm.). A 10% aqueous paste is prepared from the corn starch and homogeneously blended with the mannitol-active material mixture. The so-formed slightly moist mass is then passed through a No. 3 sieve (mesh width about 1.0 mm.). The granulate obtained is dried and, after the addition of the talcum, pressed to biconvex kernels having a weight of 150 mg. The kernels obtained can be coated with a sugar layer in the usual manner by coating.

We claim:
1. A compound selected from the group consisting of compounds of the formula

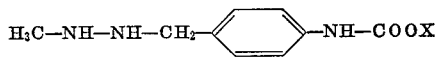

in which X is lower alkyl and pharmaceutically acceptable acid addition salts thereof.
2. 1 - (p-methoxycarbonylamino-benzyl)-2-methyl-hydrazine.
3. 1 - (p-ethoxycarbonylamino-benzyl) - 2-methyl-hydrazine.
4. 1 - (p-isopropoxycarbonylamino-benzyl) - 2-methyl-hydrazine.
5. p-Lower alkoxycarbonylamino-benzaldehyde.
6. p-Lower alkoxycarbonylamino-benzoyl halide.
7. p-Lower alkoxycarbonylamino-benzyl halide.
8. p-Lower alkoxycarbonylamino-benzyl alcohol.
9. 1 - (p-lower alkoxycarbonylamino-benzylidene)-2-methylhydrazine.

References Cited

UNITED STATES PATENTS 3,272,839  9/1966  Bollag et al. _____ 260—304

LORRAINE A. WEINBERGER, *Primary Examiner.*

L. A. THAXTON, *Assistant Examiner.*

U.S. Cl. X.R.

424—300